(12) United States Patent
Bidner

(10) Patent No.: US 9,475,381 B2
(45) Date of Patent: Oct. 25, 2016

(54) SYSTEM AND METHOD FOR REDUCING POWER TRAIN AIR RESISTANCE

(71) Applicant: Ford Global Technologies, LLC, Dearborn, MI (US)

(72) Inventor: David Karl Bidner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 13/895,192

(22) Filed: May 15, 2013

(65) Prior Publication Data
US 2014/0339000 A1 Nov. 20, 2014

(51) Int. Cl.
| B60K 15/01 | (2006.01) |
| H02K 9/12 | (2006.01) |
| B60K 6/00 | (2006.01) |
| B60K 6/405 | (2007.10) |
| B60K 6/20 | (2007.10) |
| F16H 57/04 | (2010.01) |
| B60K 1/00 | (2006.01) |

(52) U.S. Cl.
CPC .............. B60K 15/013 (2013.01); B60K 6/00 (2013.01); B60K 6/405 (2013.01); H02K 9/12 (2013.01); B60K 6/20 (2013.01); B60K 2001/006 (2013.01); F16H 57/0416 (2013.01); Y02T 10/56 (2013.01); Y10S 903/904 (2013.01); Y10T 137/0318 (2015.04); Y10T 137/6881 (2015.04)

(58) Field of Classification Search
CPC ...... B60K 15/00; B60K 15/013; B60K 6/22; B60K 6/26; B60K 6/36; B60K 6/40; B60K 6/405; B60K 6/50; B60K 13/06; B60K 17/00; B60K 6/00; B60K 6/20; B60K 2001/006; F16N 1/00; F16H 57/0416; F16H 57/0409; Y10S 903/904; Y02T 10/56; Y02T 10/32; Y02T 10/867; H02K 9/10; H02K 9/12
USPC .................. 180/69.5, 337, 339; 137/1, 351; 903/904; 310/55, 89
See application file for complete search history.

(56) References Cited

U.S. PATENT DOCUMENTS

| 3,686,973 | A | * | 8/1972 | Davison et al. ............ 74/606 R |
| 4,878,467 | A | * | 11/1989 | Schmidt ..................... 123/195 C |
| 5,501,200 | A | * | 3/1996 | Bogartz ........................ 123/527 |
| 8,056,928 | B2 | * | 11/2011 | Ijaz et al. ...................... 280/830 |
| 8,205,709 | B2 | * | 6/2012 | Gooden et al. ............... 180/339 |
| 8,479,851 | B2 | * | 7/2013 | Mack et al. ................. 180/65.6 |
| 8,565,954 | B2 | * | 10/2013 | Yeh et al. ....................... 701/22 |
| 2003/0098018 | A1 | * | 5/2003 | Bowen et al. ................ 123/527 |
| 2006/0191666 | A1 | * | 8/2006 | Busch ............................. 165/47 |

(Continued)

OTHER PUBLICATIONS

Bidner, David Karl, "System and Method for Reducing Friction in Engines," U.S. Appl. No. 14/014,197, filed Aug. 29, 2013, 38 pages.

*Primary Examiner* — Paul N Dickson
*Assistant Examiner* — Steve Clemmons
(74) *Attorney, Agent, or Firm* — Julia Voutyras; Alleman Hall McCoy Russell & Tuttle LLP

(57) ABSTRACT

A vehicle system, comprising an internal combustion engine, a transmission enclosed within a transmission case coupled to a gaseous fuel source, the transmission case having an amount of gaseous fuel located therein. Housing the transmission in a case containing low density gaseous fuel reduces the power losses from air resistance and increases fuel efficiency.

17 Claims, 7 Drawing Sheets

(56) References Cited

U.S. PATENT DOCUMENTS

| | | | |
|---|---|---|---|
| 2007/0063594 A1* | 3/2007 | Huynh | 310/59 |
| 2008/0103632 A1* | 5/2008 | Saban et al. | 700/286 |
| 2008/0224551 A1* | 9/2008 | Saban et al. | 310/54 |
| 2010/0300413 A1* | 12/2010 | Ulrey | F02D 9/12 |
| | | | 123/518 |
| 2012/0112571 A1* | 5/2012 | Stephens | 310/55 |
| 2012/0121438 A1* | 5/2012 | Sah et al. | 417/18 |
| 2014/0222275 A1* | 8/2014 | Ohsumi | B60K 6/24 |
| | | | 701/22 |
| 2015/0218981 A1* | 8/2015 | Bidner | F01M 13/028 |
| | | | 123/574 |

* cited by examiner

SYSTEM AND METHOD FOR REDUCING POWER TRAIN AIR RESISTANCE

BACKGROUND AND SUMMARY

Resistance and friction from air within one or more of the moving components of a vehicle's propulsion system contributes to fuel efficiency losses and system degradation. These losses may be most pronounced within the transmission of the vehicle where air resistance losses are compounded by the high speed rotation of the systems components. In hybrid vehicles utilizing an electric motor and generator to provide torque to the engine and capture energy from regenerative braking, these losses may be even more pronounced due to high rate of conductor rotation.

Air resistance is proportional to the density of the air surrounding rotating components, thus losses may be reduced by decreasing this density. Density may be decreased by decreasing the amount of air within the case or enclosure containing the rotating system by creating a vacuum within the system. However, air passing over the rotating components provides cooling to the components to reduce degradation from overheating. By eliminating or reducing the volume of air coming into contact with the rotating components, the amount of heat absorbed for cooling is similarly reduced.

The inventors realized that by replacing the air within the components with a lower density gas, the air resistance could be decreased while still providing sufficient cooling. They further recognized that, in vehicles operating on natural gas, such as methane, the natural gas fuel may be used to provide cooling within the rotating component systems and may then be combusted within the engine with minimum waste or additional components.

In an embodiment, a hybrid vehicle with an engine combusting methane gas may deliver an amount of methane from the fuel tank to a transmission, generator, and/or motor case. Methane may then circulate though the system absorbing heat from rotation and may be evacuated from the system and either combusted or stored for later combustion. In this way, the rotating components of the transmission, generator, and/or motor may experience less flow-resistance-based friction, while still being effectively cooled. At the same time, the gas may still be re-used for combustion in the engine.

Further embodiments may inject or deliver an amount of methane in response to a desired amount of cooling within a system so that a minimum density may be achieved without compromising a desired cooling rate.

Still further embodiments may inject an amount of methane in response to a desired amount of resistance or resistance loss minimization. Methane may then be delivered or evacuated from a component to achieve the desired level of resistance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
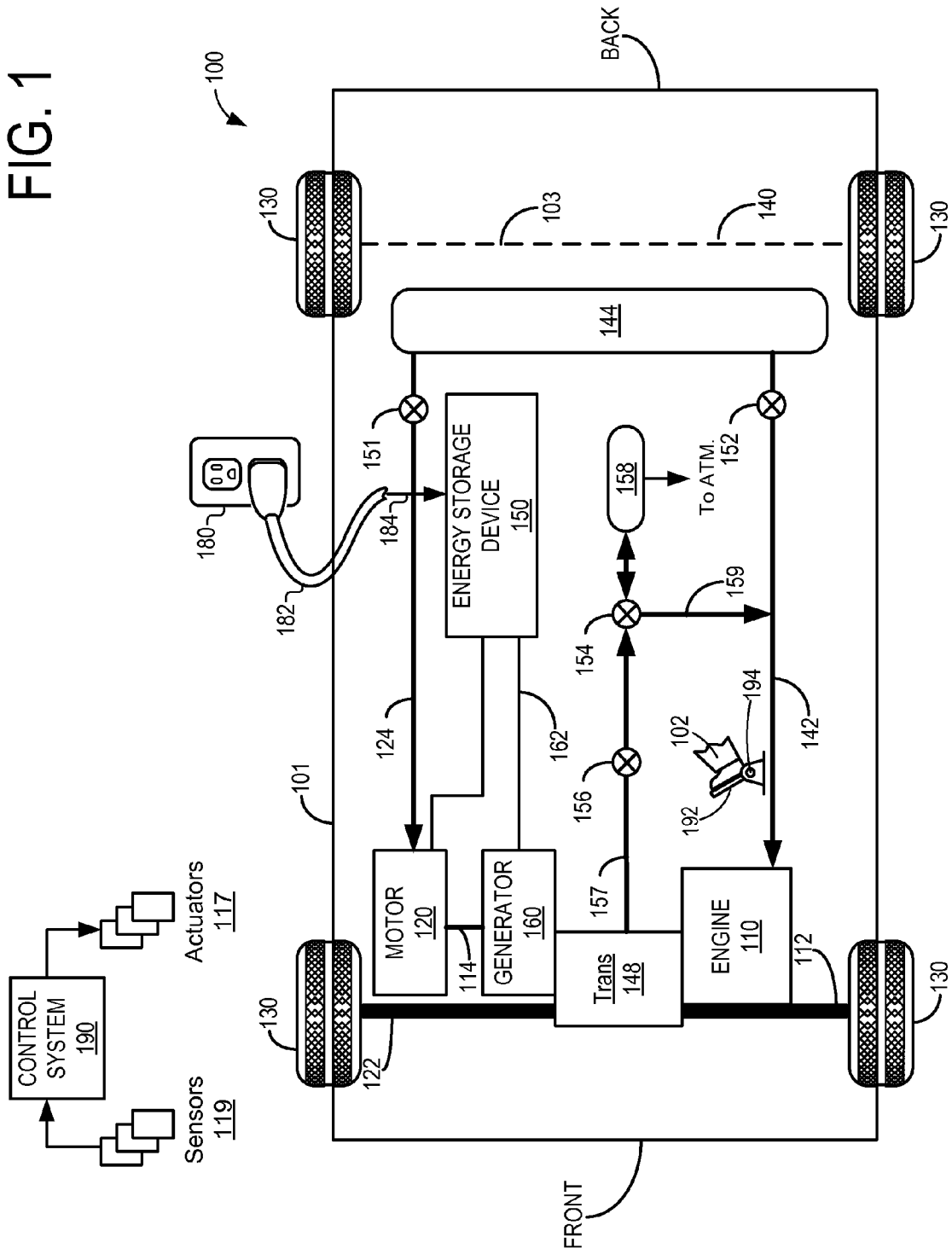
FIG. 1 schematically depicts an example embodiment of a hybrid-electric vehicle system.

In the propulsion system of motor vehicles, transmissions rely on the high speed rotation of machinery and gears. Generally a transmission is enclosed within a transmission case that allows the gears and machinery to rotate in ambient air. However, the rapidly rotating machinery experiences a counter force from the resistance of the air within the transmission. This resistance translates to a loss in fuel efficiency and available torque.

Efficiency and torque losses in hybrid vehicles are compounded by the additional rotating parts within the electric motor and generator system. In electric and hybrid electric machines, higher voltage power supply allows higher torque to be achieved at lower rotational speeds resulting in lower air resistance losses. However, higher voltage battery supplies are often larger and less efficient than their lower voltage counterparts. Additionally, higher voltage batteries have shorter life and rely on more frequent charging resulting in higher electric wattage pull in plug-in hybrids, or decreased electrical power availability in on-board generator powered hybrids.

Power loss from air resistance is directly proportional to the density of the gas or fluid in which the component is rotating. Therefore, power losses from air resistance can be reduced by decreasing the density of the gas within the case surrounding the transmission, electric motor, or generator.

During rotation, an amount of heat is produced via mutual friction between the components. To prevent engine overheating, this heat may be removed from the components and displaced in another location. This is achieved when the components come into contact with cooler gasses that absorb heat from the system and transfer it into the atmosphere or cabin via a cooling system or vehicle movement during operation. Thus, though power losses are greatly diminished in an airless vacuum or low pressure case, cooling is decreased or eliminated leading to engine degradation. Therefore, air resistance mitigation may balance the power losses from air resistance with the desired cooling when determining pressure within transmission, motor, and generator cases.

The density and thus resistance within a rigid case is a function of both the mass of gas within the case as well as the molecular properties of the gas contained. At STP, ambient air has a density around $1.2 \text{ kg/m}^3$ whereas methane has a density around $0.66 \text{ kg/m}^3$. Thus, the density of the gas and thus power loss from resistance may be decreased by replacing the ambient air within a case containing rotating parts with an amount of methane gas or and ambient air-methane gas mixture.

Compressed natural gas (CNG) engines may operate using a fuel source that contains an amount of methane for combustion. Therefore, in CNG engines, a supply of methane may be available for transmission case, motor case, or generator case fill without adding an additional methane source. Further, in CNG engines, methane evacuated from a case after absorbing an amount of heat may be cycled into the engine fuel line for combustion, minimizing fuel losses.

In an embodiment, the system disclosed herein may be used in a hybrid vehicle propulsion system with an electric generator/motor and a CNG engine. Other embodiments may have engine-only propulsion systems and/or may not operate on CNG. In non-CNG engine embodiments, CNG may be provided to the transmission, motor, or generator case via a separate CNG source tank. In these embodiments, CNG may be delivered to an air intake or an EGR system for combustion or may be evacuated from the vehicle. Still further embodiments of non-CNG engines may have a closed CNG circuit for circulation of CNG through a transmission, motor, or generator case and a cooling system. In engine-only propulsion systems, CNG may be provided to a transmission case and/or the engine.

Figure 2:
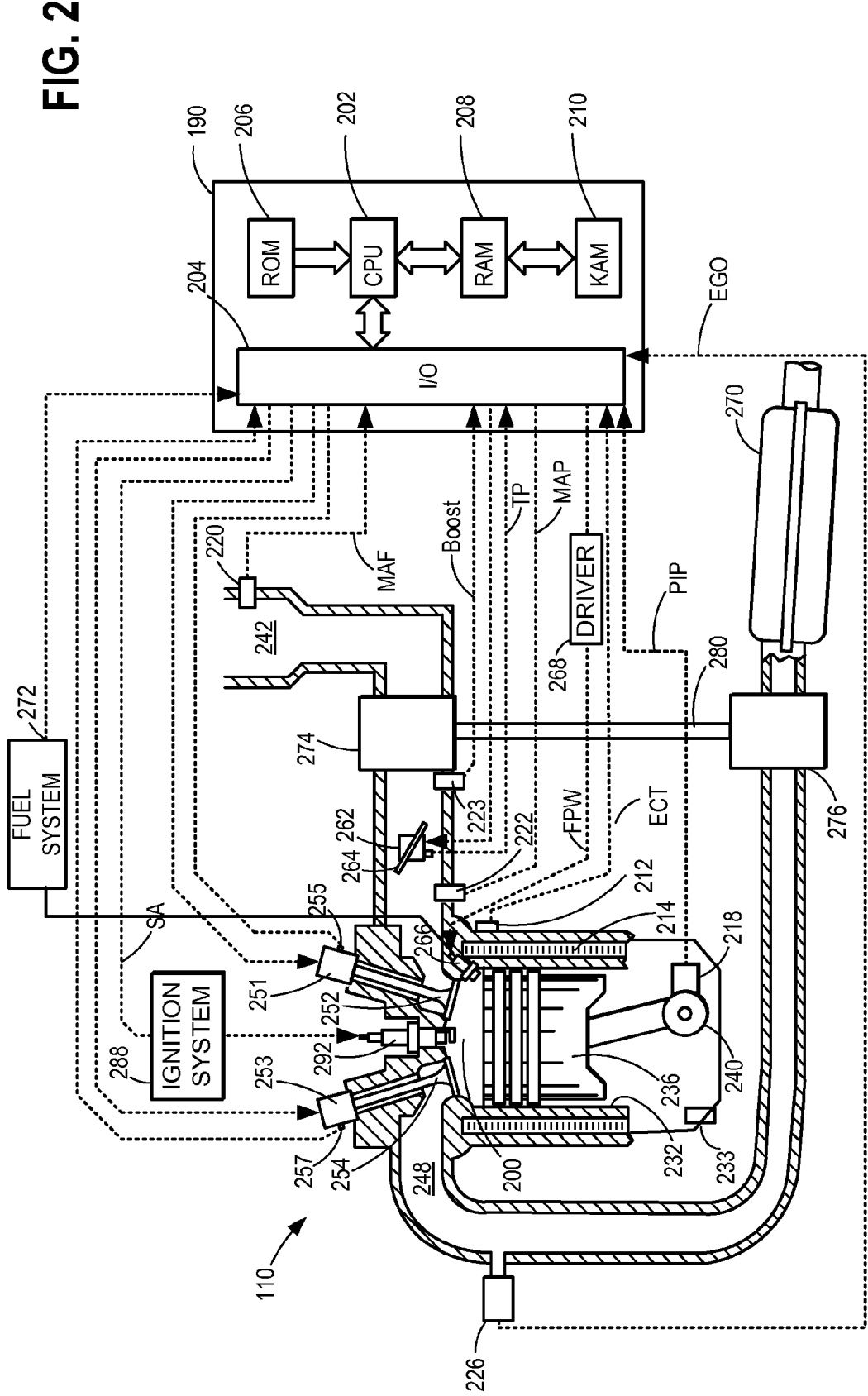
FIG. 2 schematically depicts an example embodiment of an engine system.
Figure 3:
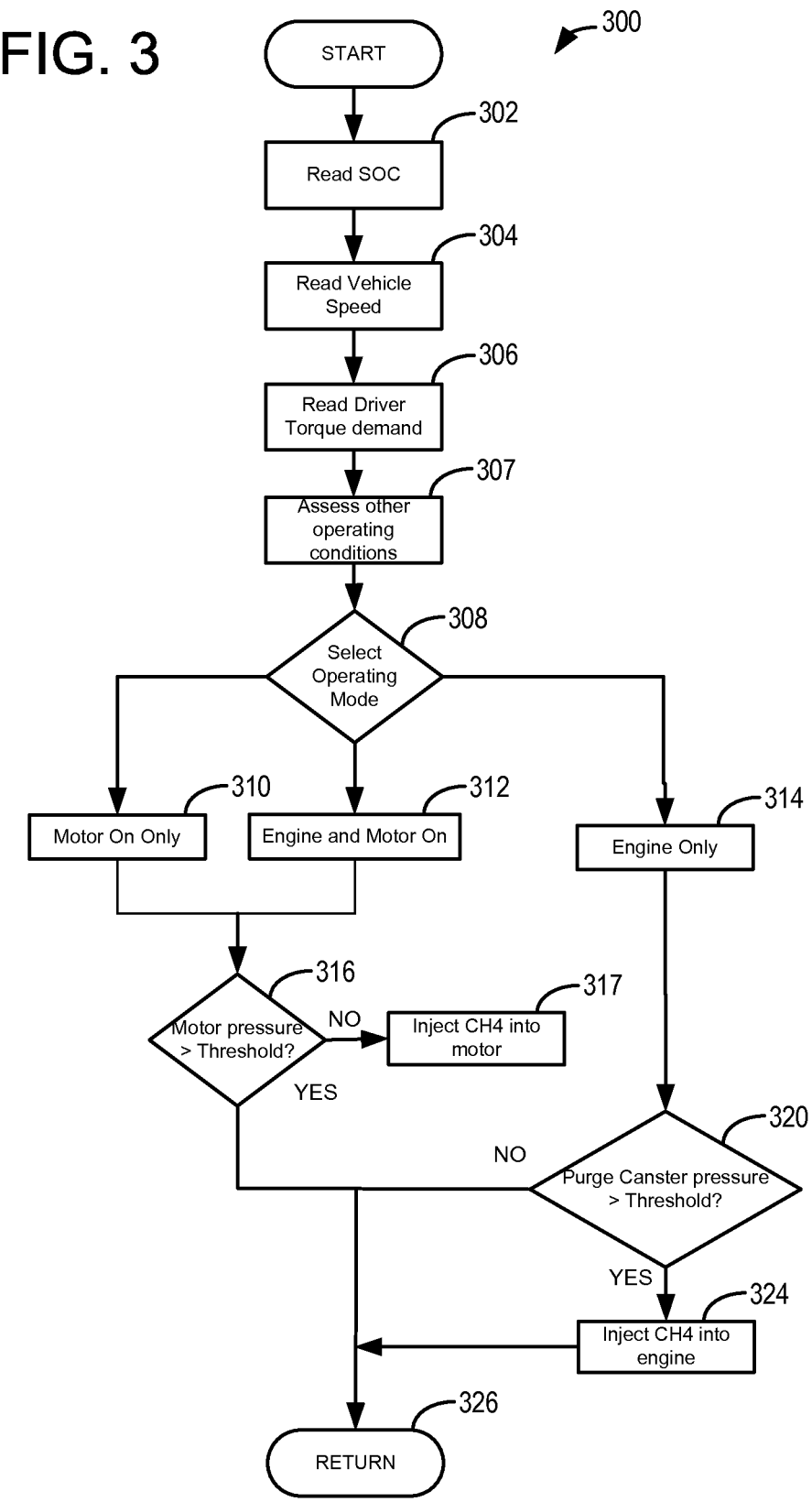
FIG. 3-FIG. 7 illustrates example operating methods for an engine system.

FIG. 1 schematically depicts an example of a hybrid vehicle comprising a CNG fueled engine, a generator, and an electric motor electrically coupled to a plug-in energy storage device. Some embodiments may have either a generator or a plug-in electric storage device. Embodiments of an electric storage device may store energy generated within a generator during regenerative braking and may additionally or alternatively store power received from an external voltage/current source. FIG. 2 schematically depicts an embodiment of a turbocharged engine that may operate on CNG and/or gasoline. FIG. 3 shows an example operating method for a hybrid-electric vehicle. FIG. 4-FIG. 7 show example control routines for CNG injection into a transmission system. It should be understood that, in hybrid-electric embodiments, the references to transmission in routines 400-700 may additionally or alternatively refer to an electric motor and/or generator. It should be further understood that references to a transmission and thus motor and/or generator may refer to a case containing a transmission, motor, and or generator.

FIG. 1 schematically depicts an example vehicle system 100 as shown from a top view. Vehicle system 100 includes a vehicle body 101 with a front end, labeled "FRONT", and a back end labeled "BACK." Vehicle system 100 may include a plurality of wheels 130. For example, as shown in FIG. 1, vehicle system 100 may include a first pair of wheels adjacent to the front end of the vehicle and a second pair of wheels adjacent the back end of the vehicle.

Vehicle system 100 includes a fuel burning engine 110 and a motor 120. Engine 110 may comprise both an internal combustion engine 110 and an electric motor 120. Motor 120 may be configured to utilize or consume a different energy source than engine 110. For example, engine 110 may consume a liquid fuel (e.g. gasoline) or a gaseous fuel (e.g. natural gas) to produce an engine output while motor 120 may consume electrical energy to produce a motor output. As such, a vehicle with propulsion system such as that shown in FIG. 1 may be referred to as a hybrid electric vehicle (HEV).

Vehicle system 100 may operate in a variety of different modes in response to operator input and operating conditions. These modes may selectively activate, deactivate, or couple a propulsion system to the motor 120, generator 160, engine 110, or some combination thereof. For example, under select operating conditions, motor 120 may propel the vehicle via drive wheel 130 as indicated by line 122 while engine 110 is deactivated.

During alternate operating conditions, engine 110 may be set to a deactivated state (as described above) while motor 120 may be operated to charge energy storage device 150. For example, motor 120 may receive wheel torque from drive wheel 130 as indicated by line 122 where the generator may convert the kinetic energy of the vehicle to electrical energy for storage at energy storage device 150 as indicated by line 162. This operation may be referred to as regenerative braking of the vehicle. The motor 120 and generator 160 may be a single entity such as a motor that has generation properties in some embodiments. However, in other embodiments, generator 160 may instead receive wheel torque from drive wheel 130, where the generator may convert the kinetic energy of the vehicle to electrical energy for storage at energy storage device 150 as indicated by line 162.

The motor 120, generator 160, and transmission 148 have rotational components that rotate within their respective cases or enclosures. Traditionally the rotating components are in an air filled enclosure and thus experience efficiency losses from air resistance. Atmospheric air has a density near 1.22 kg/m$^3$ whereas methane has a density of 0.66 kg/m$^3$ and thus energy losses from resistance are lower in a methane filled enclosure. Thus, in an embodiment, methane may be provided to motor 120, generator 160, or transmission 148 from the fuel tank. Methane may be provided via methane line 124 from fuel tank 144. Fuel tank 144 may also provide fuel for combustion in engine 110. In some embodiments, the transmission case, motor case, and generator case may be sealed to prevent the escape of methane and may form a pressure vacuum. The motor 120, generator 160, and transmission 148 may be fluidically coupled to each other to allow the flow of methane between components. A methane line 124 may be coupled directly to the motor (as shown), the generator or transmission. In some embodiments, separate methane lines may provide methane to one or more of the transmission 148, the motor 120, and the generator 160. In an example, the motor 120, generator 160, and transmission 148 may or may not be fluidically coupled to allow the exchange of methane between components. In still further embodiments, methane may be provided to one of the aforementioned components.

A valve 151 may control the flow of methane into motor 120. The mass flow rate of methane may be controlled by a control system 190 in response to input from one or more sensors 119. These sensors may monitor temperature, pressure, and/or oxygen content within the motor, generator, or transmission. An additional sensor located down steam of valve 151 may monitor the mass flow rate of methane into methane delivery line 124. Valve 151 may also be responsive to pressure within line 124 so as to maintain a pressure for minimal atmospheric air leakage into the motor, generator, or transmission.

During still further operating conditions, engine 110 may be operated by combusting fuel received from fuel system 140 as indicated by line 142. For example, engine 110 may be operated to propel the vehicle via drive wheel 130 as indicated by line 112 while motor 120 is deactivated. During other operating conditions, both engine 110 and motor 120 may each be operated to propel the vehicle via drive wheel 130 as indicated by lines 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, the propulsion system of vehicle system 100 may be configured as a series type vehicle propulsion system, whereby the engine does not directly propel the drive wheels. Rather, engine 110 may be operated to power motor 120, which may in turn propel the vehicle via drive wheel 130 as indicated by line 122. For example, during select operating conditions, engine 110 may drive generator 160, which may in turn supply electrical energy to one or more of motor 120 as indicated by line 114 or energy storage device 150 as indicated by line 162.

As another example, engine 110 may be operated to drive motor 120 which may in turn provide a generator function to convert the engine output to electrical energy, where the electrical energy may be stored in energy storage device 150 for later use by the motor. Embodiments of energy storage device 150 may include one or more rechargeable batteries, fuel cells, and/or capacitors for example. In these examples, electrical energy may be temporarily converted to chemical or potential energy for storage. The vehicle propulsion system may be configured to transition between two or more of the operating modes described above in response to operating conditions.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc.

Fuel system 140 may include one or more fuel storage tanks 144 for storing fuel on-board the vehicle. For example, fuel tank 144 may store a condensed natural gas (CNG) fuel source, such as methane gas. Other embodiments may have a first gaseous fuel source stored in fuel tank 144 and a second liquid fuel source stored in an additional tank. In these embodiments the gaseous fuel source may be coupled to engine 110 as well as motor 120 and the liquid fuel source may be coupled to engine 110. Other embodiments may couple gaseous fuel source to motor 120 and not engine 110, engine 110 may be coupled to the liquid fuel source. In some examples, the fuel may be stored on-board the vehicle as a blend of two or more different fuels. A liquid fuel source may be configured to store a blend of gasoline and ethanol (e.g. E10, E85, etc.) or a blend of gasoline and methanol (e.g. M10, M85, etc.). A gaseous fuel source may be a blend of methane, hydrogen gas, oxygen gas, or carbon monoxide. Fuels or fuel blends may be delivered to engine 110 as indicated by line 142. Still other suitable fuels or fuel blends may be supplied to engine 110, where they may be combusted at the engine to produce an engine output. The engine output may be utilized to propel the vehicle as indicated by line 112 or to recharge energy storage device 150 via motor 120 or generator 160. Note that in some examples the first gaseous fuel source may be coupled to a transmission or generator directly or via motor 120.

Additional fuel may be provided to engine 110 from transmission purge line 157. Fuel may be provided for combustion additionally or alternatively to fuel provided from fuel tank 144 via fuel line 142. Purge line 157 may include three way valves 154. Valve 154 may couple purge line 157 to purge canister 158 when the motor is operating. Three way valve 154 may be responsive to operating conditions and may couple purge canister 158 to fuel line 142 when the engine is operating in combustion mode. Valve line 159 may provide fuel for subsequent combustions when sufficient pressure is available. When the engine is not operating in a combustion mode, valve line 159 may be de-coupled and purge canister 158 coupled to purge line 157 via valve 154. Thus when the engine is not operating fuel may be stored in purge canister 158 for subsequent combustion when the engine is operating. Purge canister 158 may provide a pressure differential to accelerate fuel into the fuel line via valve line 159. Three-way valve 154 may therefore be responsive to the pressure available in purge canister 158, if sufficient pressure is not available to accelerate fuel from canister 158 to fuel line 142 during combustion, valve 154 may close so that methane may be stored until sufficient pressure is accumulated in the canister.

Purge canister 158 may have an amount of methane located therein. Purge canister 158 may provide a pressure differential so that methane may be accelerated into the fuel line from the purge canister via valve 154. In some embodiments methane may be circulated from the purge canister into motor 120, generator 160, or transmission 148.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, transmission 148, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by line 184. As a non-limiting example, the propulsion system of vehicle system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, the propulsion system of vehicle system 100 may be refueled by receiving fuel via a fuel dispensing device. In some embodiments, fuel tank 144 may be configured to store the fuel received from the fuel dispensing device until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp.

This plug-in hybrid electric vehicle, as described with reference to the propulsion system of vehicle system 100, may be configured to utilize a secondary form of energy (e.g.

electrical energy) that is periodically received from an energy source that is not otherwise part of the vehicle.

It should be understood that though FIG. 1 shows a plug-in hybrid electric vehicle, in other examples, vehicle system 100 may be a hybrid vehicle system without plug-in components. Further, in other examples, vehicle system 100 may not be a hybrid vehicle but may be another type of vehicle with other propulsion mechanisms, e.g., a vehicle with a gasoline engine or a CNG engine which may or may not include other propulsion systems.

FIG. 2 depicts an example embodiment of a cylinder 200 of engine 110. Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with drive wheel 130, motor 120 or generator 160 via a transmission.

Cylinder 200 may receive intake air via an intake passage 242. Intake passage 242 may also communicate with other cylinders of engine 110 as well as cylinder 200. In some embodiments, one or more of the intake passages may include a boosting device such as a turbocharger or a supercharger. For example, FIG. 2 shows engine 110 configured with a turbocharger including a compressor 274 arranged along intake passage 242, and an exhaust turbine 276 arranged along exhaust passage 248. Compressor 274 may be at least partially powered by exhaust turbine 276 via a shaft 280 where the boosting device is configured as a turbocharger. However, in other examples, such as where engine 110 is provided with a supercharger, exhaust turbine 276 may be optionally omitted, where compressor 274 may be powered by mechanical input from a motor or the engine. Intake passage 242 may include a throttle 262 including a throttle plate 264 that may be adjusted by control system 190 to vary the flow of intake air that is provided to the engine cylinders. For example, throttle 262 may be disposed downstream of compressor 274 as shown in FIG. 2, or may alternatively be provided upstream of compressor 274.

Cylinder 200 may communicate with intake passage 242 via one or more intake valves 252. Cylinder 200 may exhaust products of combustion via an exhaust passage 248. Cylinder 200 may communicate with exhaust passage 248 via one or more exhaust valves 254. Exhaust passage 248 may receive exhaust gases from other cylinders of engine 110 in addition to cylinder 200. Exhaust gas sensor 226 is shown coupled to exhaust passage 248 upstream of emission control device 270. Sensor 226 may be any suitable sensor for providing an indication of exhaust gas AFR such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 270 may be a three way catalyst (TWC), NOx trap, various other emission control devices, or combinations thereof.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

In FIG. 2, fuel injector 266 is shown coupled directly to cylinder 200 for injecting fuel directly therein in proportion to the pulse width of signal FPW received from control system 190 via electronic driver 268. In this manner, fuel injector 266 provides what is known as direct injection (hereafter referred to as "DI") of fuel into combustion cylinder 200. As shown, injector 166 may be a side injector, it may also be located overhead of the piston, such as near the position of spark plug 292. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 266 from high pressure fuel system 272 including a fuel tank, fuel pumps, a fuel rail, and driver 268. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to control system 190.

Fuel injector 266 may be arranged in intake passage 246, rather than in cylinder 200, in a configuration that provides what is known as port injection of fuel (hereafter referred to as "PFI") into the intake port upstream of cylinder 200.

Cylinder 200 may have a compression ratio, which is the ratio of volumes when piston 236 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

A non-limiting example of control system 190 is depicted schematically in FIG. 2. Control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 can communicate with various sensors and actuators of engine 110 via an input/output device 204. As a non-limiting example, these sensors may provide sensory feedback in the form of operating condition information to the control system, and may include: an indication of mass airflow (MAF) through intake passage 242 via sensor 220, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of PCV exhaust gas moisture and hydrocarbon content via PCV exhaust line gas sensor 233, an indication of intake valve position via sensor 255, and an indication of exhaust valve position via sensor 257, among others. For example, sensor 233 may be a humidity sensor, oxygen sensor, hydrocarbon sensor, and/or combinations thereof.

Intake valve 252 may be controlled by control system 190 via actuator 251. Similarly, exhaust valve 254 may be controlled by control system 190 via actuator 253. During some conditions, control system 190 may vary the signals provided to actuators 251 and 253 to control the opening and closing of the respective intake and exhaust valves. The position of intake valve 252 and exhaust valve 254 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), and variable valve timing (VVT) and/or variable valve lift (VVL) systems that may be operated by control system 190 to vary valve operation. For example, cylinder 200 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

FIG. 3 shows a high-level routine 300 for operating the propulsion system of a hybrid-electric vehicle, such as propulsion system of vehicle system 100 shown in FIG. 1. Routine 300 may be performed at engine on and may subsequently be performed repeatedly to provide a determination of the operating mode of the propulsion system.

Routine 300 may begin at 302 where control system 190 assesses the state of charge (SOC) of the battery 150 or another energy storage device that may provide power to the motor 120. The controller may also read other operating parameters of said battery, for example the battery voltage or battery capacity may be read. Next, at 304, control system 190 may read the vehicle speed as determined by the vehicle speed sensor. Next, at 306, control system 190 may read the driver torque demand. The driver torque demand may be a function of the accelerator pedal position determined by a pedal position sensor, and may also be a function of vehicle speed as determined in 304, and may also utilize other measurements by additional on-board sensors 119. At 307, other operating conditions may be read by the control system 190. These may include fuel level, ambient conditions such as temperature and humidity, fuel usage rates, vehicle location as determined through a global positioning system, or other conditions or measurements assessed by additional on-board sensors 119.

Next, at 308, control system 190 may determine a presiding operating mode based on the values of the operational parameters assessed in 302-307. For simplicity, three exemplary operating modes are shown, but there may be additional operating modes available depending on the vehicle, propulsion system, fuel system, engine system and other design parameters which may include an alternative or additional fuel source, multiple batteries or other energy storage devices, or the presence or absence of a turbocharger. Routine 300 may move to 314 if it is engine-on and motor-off operation is determined. Routine 300 may move to 312 if both engine on and motor on operation is determined. Routine 300 may move to 312 if motor on and the engine off operation is determined. In one example embodiment of a vehicle, control system 190 may be able to selectively activate some or all of the cylinders 30. In these example systems, when the engine 110 is on at step 312 or 314 one or more cylinders may be activated and one or more cylinders may be deactivated in accordance with the assessment of operational parameters at 308.

If the motor is operating alone at 310 or the motor and the engine are operating at 312, the method may move on to step 316 to determine if the pressure in the motor is above a threshold. The pressure may be determined by one or more sensors located within the motor, generator, or transmission. The threshold may correspond to an amount of $CH_4$ within a motor or transmission component to achieve an amount of air resistance or a desired AFR within one or more of the aforementioned components. The threshold may be determined by one of the methods described herein.

If the pressure is below a threshold, at step 317 fuel may be injected into the motor, generator, transmission, or some component thereof. Methane within the case containing rotating components may decrease the amount of air within the case and replace it with lower density methane. The lower density of methane may result in reduced friction and resistance experienced by moving components, cooler operation, and greater efficiency.

If the motor is off and combustion is occurring within the engine at 314, it may be determined at 320 is the pressure within the purge canister is above a threshold. This threshold may correspond to a pressure able to achieve fuel injection into the fuel line from the purge canister, generator, motor, or transmission. In embodiments utilizing condensed natural gas or a turbocharger, the pressure in the fuel line may be high, thus a sufficiently higher pressure may exist within the purge canister to enable the injection of methane into the fuel line and prevent back flow. This sufficiently heightened pressure may be proportional to the amount of methane in the canister, thus, if pressure is not above the threshold at 320 the process may end at 326 to allow additional build up of fuel within the canister during subsequent motor operation. In other embodiments, fuel from the fuel tank may be temporarily suspended to allow for a pressure vacuum to form within the fuel line. This lower pressure may lower the threshold for fuel injection from the purge canister at 320. In still further embodiments, 320 may be initiated by the termination of an engine on event. The termination of an engine on event may halt the delivery of CNG to the engine and may thus lower the pressure in the fuel line thus lowering the pressure threshold able to achieve fuel injection determined at 320.

If sufficient pressure exists within the canister, the routine may continue to 324. At 324 fuel stored within the purge canister may be injected into the fuel line by actuating a one way valve. The injection may continue until the canister is empty or may terminate when the pressure within the canister falls below a threshold. Fuel injected to the fuel line may then be delivered to the engine for subsequent combustion. The process may end at 326. The process may be repeated continuously or at given time intervals, it may also be initiated at an engine on event or when the pressure within the purge canister, motor, generator, or transmission is above a threshold.

Figure 4:
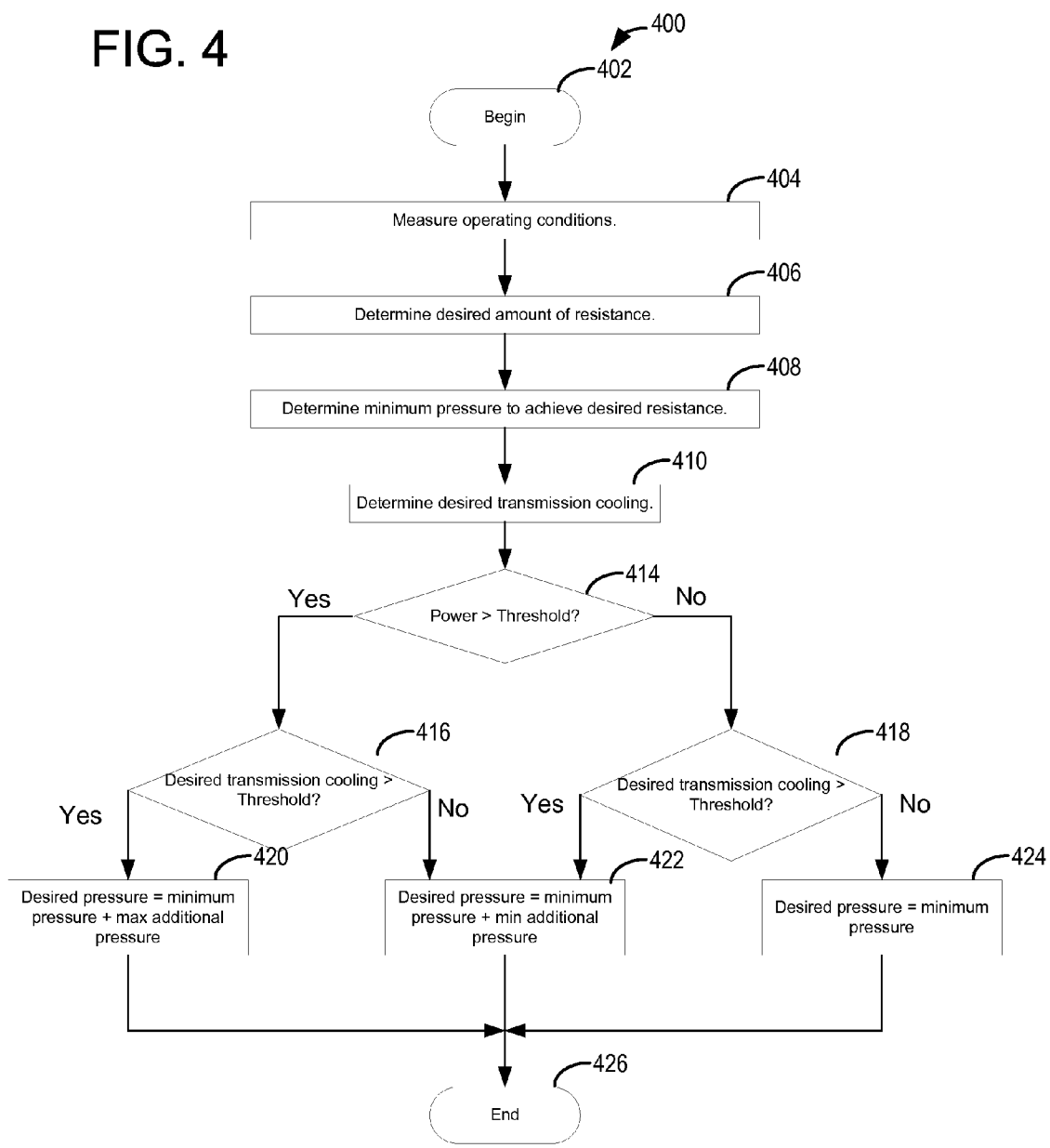

FIG. 4 shows a flowchart depicting method 400 in accordance with the present disclosure. Method 400 may be carried out by control system 190. Method 400 may be implemented as a subroutine of another method, for example method 300. In particular, method 400 may be implemented in a gaseous fueled, bi-fueled or multi-fueled hybrid vehicle comprising an electric motor, for example, the system depicted in FIG. 1. Method 400 may be executed as part of a routine to mitigate air resistance in a motor, generator, transmission, or some combination thereof.

At 404 operating conditions may be measured. Operating conditions may include engine speed, load, and pressure within the motor, generator, transmission, or some combination thereof. At 406 an amount of air resistance desired in the motor may be determined. An amount of air resistance desired may be responsive to operating conditions measured at 404. The minimum amount of pressure from methane may be determined to achieve an amount of air resistance determined at 408. The minimum amount of pressure desired may be in response to one or more operating conditions measured at 402 as well as the presiding air to fuel ratio within the motor, generator, and/or transmission.

An amount of transmission cooling may be determined at 410. The amount of transmission cooling desired may be responsive to the presiding temperature within the transmission. In other embodiments an amount of cooling desired may be determined in the motor and/or generator and may be used in addition or alternative to the amount of cooling desired in the transmission. Though decreased air resistance in one of the aforementioned components may be provided by a decreased pressure and thus decreased amount of methane within one of the above components, an amount of gas or air may be desirable to achieve cooling by circulating gas or air through one or more of the systems with moving components. Air or gas may absorb heat from that is then carried away from the heated component to achieve cooling.

At 414 it may be determined if the power desired from the motor is above a threshold. The threshold may be responsive to the amount of torque demanded as well as the operating state of the vehicle, including the current power output of an engine or the power remaining within an energy storage system that may, in some part, be used to power the motor. The energy storage system may include a battery that may receive power from an external device, the engine, or and/or regenerative braking.

If the power demand is above a threshold it may then be determined if the desired amount of transmission cooling is above a threshold. In other embodiments the desired cooling within the motor or generator may be determined at 410 and compared to a threshold at 416. If the desired cooling is above a threshold the desired pressure within the transmission may be determined to be the minimum amount of pressure desired to achieve a desired air resistance as determined at 408 plus a maximum additional amount of pressure.

The maximum additional amount of pressure may be responsive to the presiding AFR within the transmission, motor, generator, or some combination thereof. The maximum amount of additional pressure may also be a function of the amount of methane that may be added to the system to obtain an AFR below a flammability threshold. This may be determined to prevent ignition within any of the aforementioned components.

Because methane is flammable within a limited AFR window, methane provides a heightened range of achievable AFRs than other lower density fuels such as hydrogen. Ignition within one of the aforementioned components may cause degradation. The flammability threshold may also be responsive to the pressure such that the desired pressure may be a function of the AFR from methane injection as well as the pressure within the system that is achieved by the increased amount of methane injection.

If the desired transmission cooling is below a threshold value at 416 a desired amount of pressure may be a function of the minimum pressure to achieve a desired air resistance determined at 408 plus a minimum additional amount of pressure. The minimum additional amount of pressure may also be responsive to the flammability threshold of methane by one of the methods described in reference to 420.

If at 414 the power desired is below a threshold then be determined if the desired amount of transmission cooling is above a threshold. In other embodiments the desired cooling within the transmission may be determined at 410 and compared to a threshold at 416. If the desired cooling is above a threshold the desired pressure within the transmission, it may be determined to be the minimum amount of pressure desired to achieve a desired air resistance as determined at 408 plus a minimum additional amount of pressure at 422. The minimum amount of additional pressure may be the same or different than the minimum amount of addition pressure determined if the desired amount of transmission cooling is below a threshold at 416.

If the power desired is below a threshold at 414 and the amount of transmission cooling is below a threshold at 418, then at 424 the desired pressure within the motor, generator, and/or transmission may be determined to be the minimum amount of pressure able to achieve an amount of air resistance as determined at 408.

In some embodiments the desired transmission cooling may be a function of the power desired in addition or alternative to the temperature within one of the aforementioned components receiving methane from the fuel tank. It may similarly be a function of the AFR and pressure below a flammability limit of methane.

The desired pressure may then be communicated to a control system and an amount of methane may be injected or delivered to the motor, generator, or transmission via a valve. An amount of methane may also be released from one of the aforementioned components via a valve and delivered to a purge canister. In some embodiments, an amount of methane released may be a function of desired cooling. An amount of methane injected or delivered may then be a function of the amount of methane released and/or current pressure within an aforementioned component as well as the desired pressure. For example, an amount of cooling desired and the current temperature of methane may be used to determine an amount of methane to be released from the system. An amount of methane delivered may then be determined in response to the pressure within the system after the amount of methane is released and the desired pressure as determined at 420, 422, or 424. The method may end at 426. The method may repeat immediately, at given time intervals, or in response to operating conditions.

Figure 5:
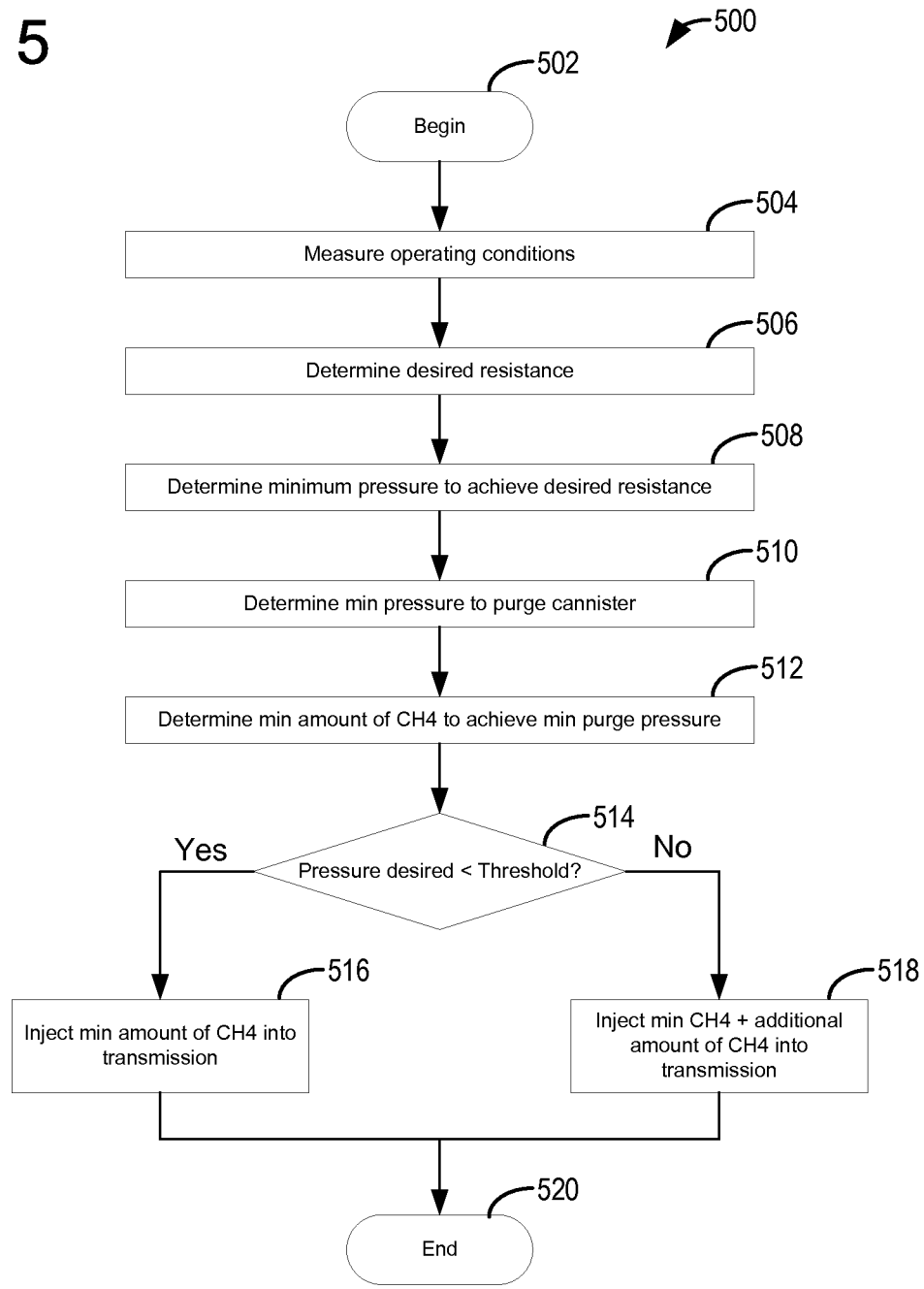

FIG. 5 shows a flowchart depicting method 500 in accordance with the present disclosure. Method 500 may be carried out by control system 190. Method 500 may be implemented as a subroutine of another method, for example method 300. In particular, method 500 may be implemented in a gaseous fueled, bi-fueled or multi-fueled hybrid vehicle comprising an electric motor, for example, the system depicted in FIG. 1. Method 500 may be executed as part of a routine to mitigate air resistance in a motor, generator, transmission, or some combination thereof.

At 504 operating conditions may be measured. Operating conditions may include engine speed, load, and pressure within the motor, generator, transmission, or some combination thereof. At 506 an amount of air resistance desired in the motor may be determined. An amount of air resistance desired may be responsive to operating conditions measured at 504. The minimum amount of pressure from methane may be determined to achieve an amount of air resistance determined at 508. The minimum amount of pressure desired may be in response to one or more operating conditions measured at 504 as well as the presiding air to fuel ration within the motor, generator, and/or transmission.

At 510 a minimum amount of pressure within the purge canister able to purge the canister either completely or partially of methane may be determined. The minimum purge pressure may be responsive to a presiding pressure within the fuel intake line as well as a presiding pressure within the purge canister or purge line. A minimum pressure may correspond to a pressure able to purge the canister partially of methane, it may also refer to a minimum pressure within the canister above a pressure within the fuel line able to purge then canister of a predetermined quantity of methane.

At 512 a minimum amount of methane within the purge canister to achieve the minimum purge pressure may be determined. This amount may be responsive to a pressure within the canister, fuel line, or may be a predetermined relationship between purge pressure and mass of methane within the canister as determined by a control system.

It may then be determined if the engine is being operated at a low pressure control condition. Low pressure control condition may be a condition in which minimum pressure from methane is desired within the transmission, generator, motor, or power train. This threshold may be determined via one of the methods described herein or an alternate method not otherwise specified. Low pressure control operating conditions may be responsive to an engine-only, motor-only, or dual power operation and/or the cooling demands within a motor or transmission component. If the pressure desired in one or more of the aforementioned components id less than a threshold corresponding to a low pressure condition at 514, routine 500 may continue to 516. If the pressure desired is above a threshold at 514, routine 500 may continue to 518.

At 516 a minimum amount of methane may be delivered from the fuel tank to the transmission, motor, or generator. Additionally, an amount may be delivered to one or more components from a fuel line directly; the components may then be fluidically coupled to receive methane from the fuel line via one or more of the aforementioned components. For example, as described in routine 500, a minimum amount of methane may be injected into or delivered to the transmission in response to a low pressure control condition. This methane may be delivered to the transmission via configuration such as that schematically depicted in FIG. 1, such that a minimum amount of methane is injected into or delivered to the motor and is then delivered to the transmission via a fluidically coupled generator. In still further embodiments each of the aforementioned components may have a minimum amount of methane injected into them and may each be independently coupled to a purge canister. Other embodiments may couple the fuel tank to one component that may be coupled to one or more additional components in any suitable arrangement.

If the vehicle is not operating in a low pressure control mode as determined at 514 an amount of methane may be injected or delivered to achieve the minimum purge pressure as determined at 512 as well as an additional amount of methane. The additional amount of methane may be responsive to one or more operating conditions and may be determined by one of the methods described herein or other methods not otherwise specified. For example, the additional amount of methane injected or delivered may be a function of a desired amount of cooling or air resistance within the motor, generator, transmission, and/or power train. The method may end at 520. The method may repeat immediately, at given time intervals, or in response to operating conditions.

Figure 6:
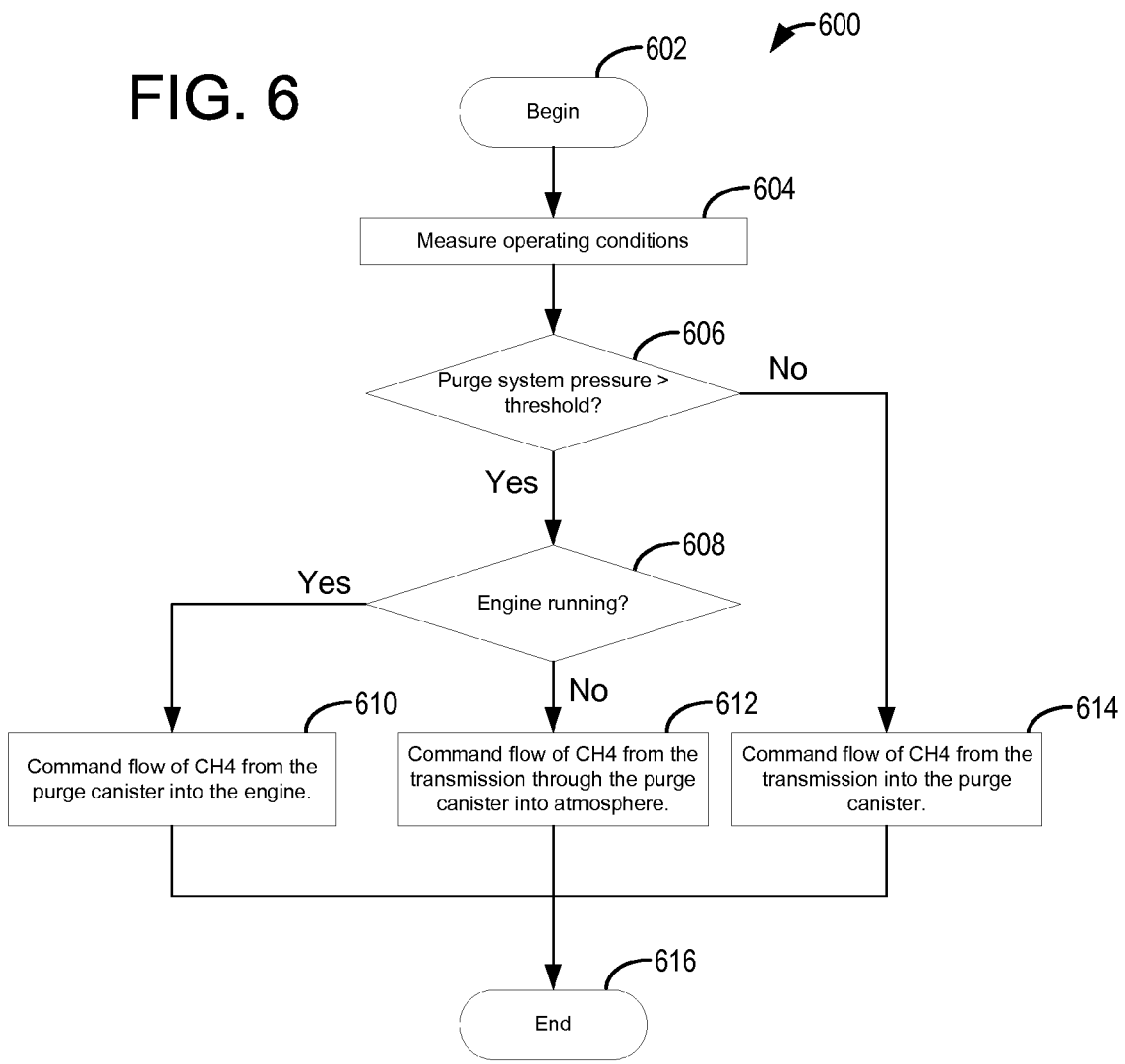

FIG. 6 shows a flowchart depicting method 600 in accordance with the present disclosure. Method 600 may be carried out by control system 190. Method 600 may be implemented as a subroutine of another method, for example method 300. In particular, method 600 may be implemented in a gaseous fueled, bi-fueled or multi-fueled hybrid vehicle comprising an electric motor, for example, the system depicted in FIG. 1. Method 600 may be executed as part of a routine to mitigate air resistance in a motor, generator, transmission, or some combination thereof.

The method may begin at 602. At 604 operating conditions may be measured. Operating conditions may include engine speed, load, and pressure within the motor, generator, transmission, or some combination thereof. Operating conditions may also include pressure within the fuel line, purge line, and purge canister as well as a desired AFR within the engine for combustion or within the motor, generator, transmission, or power train in response to a flammability threshold that may be determined by one or more methods described herein or other methods not otherwise specified.

It may be determined if the purge system pressure is above a threshold at 606. The threshold may refer to a pressure within the purge canister able to purge the canister either completely or partially of methane. The pressure may also be responsive to a max pressure rating for the purge canister which may be predetermined and canister specific. This rating may correspond to a pressure within the canister above which may contribute to canister or system degradation. The purge pressure threshold may be responsive to a presiding pressure within the fuel intake line as well as a presiding pressure within the purge canister or purge line. A threshold pressure may correspond to a pressure able to purge the canister partially of methane, it may also refer to a minimum pressure within the canister above a pressure within the fuel line able to purge then canister of a predetermined quantity of methane.

If the pressure is not above a threshold at 606, the method may continue to step 614 where methane may continue to be delivered to the purge canister as able to support cooling of a power train, transmission, motor, and/or generator system. This may be determined by one of the methods disclosed herein or other methods not otherwise specified. This may be carried out by a valve that may be actuated by a control system such as that depicted in FIG. 1 and described in further detail below.

If the pressure is above a threshold, at 606, it may be determined it if the engine is running at 608. Running may refer to operating via combustions and/or providing torque to a transmission.

If the engine is running a valve may be actuated that may couple to purge canister to the fuel line at 610. In some embodiments, the valve may be a three-way valve that may be actuated to selectively allow the flow of methane from the transmission to the purge canister, from the transmission to the fuel intake line, or from the canister to the fuel intake line. Methane delivered to the canister may also correspond to a desired AFR within the engine for combustion as well as a present mass flow rate of methane into the engine via the fuel intake line. Methane may be coupled to the fuel intake line from the purge canister and/or valve via a valve line that may also include one or more valve to control the flow if methane into the fuel line. Fuel delivered to the fuel line may be combined with an amount of fuel delivered from the fuel tank via the fuel line. The fuel mixture may be subsequently delivered to the engine for combustion.

If the engine is not running as determined at 608 the aforementioned valve may continue to couple the purge line to the canister. The canister may be or remain decoupled from the fuel line for methane delivery to the engine. At 612, a second valve may be actuated that may couple methane to an exhaust system. Methane may then be released from the purge canister into the ambient air, an additional low pressure fuel tank, a methane fuel tank, or an emission control device. The method may end at 616. The method may repeat immediately, at given time intervals, or in response to operating conditions.

Figure 7:
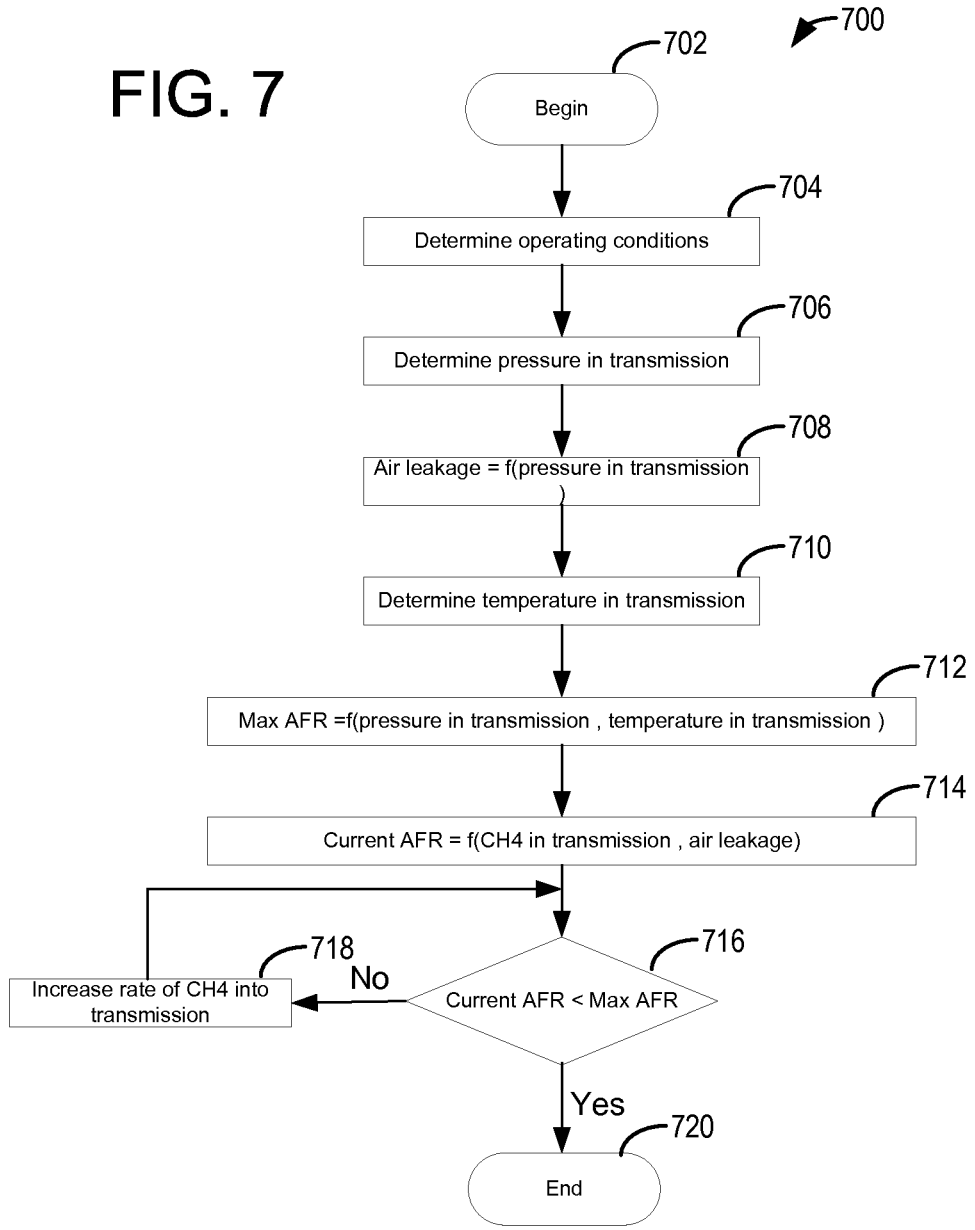

FIG. 7 shows a flowchart depicting method 700 in accordance with the present disclosure. Method 400 may be carried out by control system 190. Method 700 may be implemented as a subroutine of another method, for example method 300. In particular, method 700 may be implemented in a gaseous fueled, bi-fueled or multi-fueled hybrid vehicle comprising an electric motor, for example, the system depicted in FIG. 1. Method 700 may be executed as part of a routine to mitigate air resistance in a motor, generator, transmission, or some combination thereof.

At 704 operating conditions may be measured. Operating conditions may include engine speed, load, and/or AFR within the motor, generator, transmission, or some combination thereof. At 706 the pressure may be determined within the motor, generator, transmission, or some combination thereof. Pressure may be determined in response to one or more sensors within one or more of the aforementioned systems.

At 706 the pressure within the transmission may be determined via one or more sensors in communication with the control system. In other embodiments, the pressure may be determined in the motor, or generator in addition or alternative to the transmission. At 708 an amount of air leakage and/or an air leakage rate may be determined as a function of this pressure within the transmission. An amount of leakage may also be responsive to a rate or amount of methane delivered to the transmission and an amount of methane that has exited the transmission as well as an amount of methane within a transmission as determined by one or more sensors and/or the control system. The temperature within the transmission or the temperature of methane within the transmission may be determined at 710 by one or more sensors in communication with the control system. In other embodiments, a temperature within the transmission may be used to determine the pressure within the transmission and/or the amount or rate of air leakage.

At 712 a maximum AFR may be determined as a function of the pressure within the transmission as well as the temperature within the transmission. The maximum AFR may correspond to a maximum AFR that is sufficiently below the flammability AFR limit of methane under the presiding conditions. Methane may provide an advantage over other low density fuel sources that may be used in other embodiments because of the high AFR limit of methane flammability.

At 714, the presiding AFR may be determined as a function of the amount of methane within the transmission as well as the amount of air or air leakage rate into the transmission. In some embodiments this may be determined by the aforementioned methods and/or may utilize an oxygen sensor within the transmission.

The current AFR may be compared to the maximum AFR as determined at 712 at 716. If the current AFR is found to be below the max AFR the method may end at 720. If the current AFR is found to be above a maximum AFR at 716, than the amount of methane delivered to the transmission may be increased at 718. Method 700 may then return to 716 where it may again be determined if the presiding, decreased AFR is below the maximum AFR. If the presiding AFR is again found to be above a threshold, the rate of methane delivered to the transmission may continue to increase until the AFR is found to be below the maximum AFR. The method may then end at 720. The method may repeat immediately, at given time intervals, or in response to operating conditions.

Note, for the purposes of this disclosure, and the methods 300-700 specifically, all references to the transmission may also be understood to refer to the power train, generator, motor, as well as any other component receiving methane either directly or indirectly, or a combination of the aforementioned components or systems. For example, any method that is responsive to or effectual of a condition within a transmission may be understood to be responsive to or effectual of one or more of a power train, motor, or generator without departing from the scope of this disclosure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
   an internal combustion engine; and
   a transmission enclosed within a transmission case coupled to a gaseous fuel source, the transmission case having an amount of gaseous fuel located therein;
   the gaseous fuel source coupled to an engine fuel line, wherein a vehicle is driven with power from the internal combustion engine, through gears positioned within the transmission case, and then to wheels of the vehicle.

2. The vehicle system of claim 1, further comprising an electric motor providing an amount of torque to a drive train, the electric motor located within a motor case coupled to the gaseous fuel source, the motor case having an amount of gaseous fuel located therein.

3. The vehicle system of claim 2, further comprising an electric generator generating an amount of energy from regenerative braking, the electric generator located within a generator case, the generator case having an amount of gaseous fuel located therein.

4. The vehicle system of claim 1, wherein the transmission case is fluidically coupled to a motor case, a generator case, or a combination thereof.

5. The vehicle system of claim 1, further comprising a purge canister fluidically coupled to the transmission case.

6. The vehicle system of claim 5, wherein the purge canister is fluidically coupled to a fuel line via a three-way valve.

7. The vehicle system of claim 1, wherein the gaseous fuel source includes methane gas.

8. A method for a vehicle, comprising:
delivering a gaseous fuel into a transmission case of the vehicle and routing the gaseous fuel from inside the transmission case to an engine of the vehicle; and
adjusting an amount of gaseous fuel within the transmission case in response to an air to fuel ratio (AFR) within the transmission case being above a threshold.

9. The method of claim 8, further comprising delivering gaseous fuel into an electric motor case.

10. The method of claim 8, further comprising delivering gaseous fuel into an electric generator case.

11. The method of claim 8, further comprising driving the vehicle with power from the engine, through gears positioned within the transmission case, and then to wheels of the vehicle.

12. The method of claim 11, further comprising adjusting the delivery of the gaseous fuel to the transmission case by injecting the fuel into a fuel line via a purge canister in response to a pressure within the purge canister.

13. The method of claim 8, further comprising adjusting the amount of gaseous fuel within the transmission case in response to a temperature within the transmission case.

14. A method for operating a hybrid vehicle, comprising:
injecting a first amount of compressed natural gas (CNG) into an electric motor case;
injecting a second amount of CNG into a cylinder of a combustion engine in response to a desired engine torque;
providing torque to a drive train from a motor in the electric motor case and the engine;
purging a third amount of CNG from a transmission case into a purge canister; and
injecting a fourth amount of CNG from the purge canister into the cylinder in response to one or more operating conditions.

15. The method of claim 14, further comprising determining the first amount of CNG injected into the electric motor case in response to an amount of air resistance desired within the electric motor case.

16. The method of claim 14, further comprising transmitting torque from the engine and the motor through a transmission in the transmission case.

17. The method of claim 16, further comprising driving a vehicle wheel with an output of the transmission.

* * * * *